2,799,402

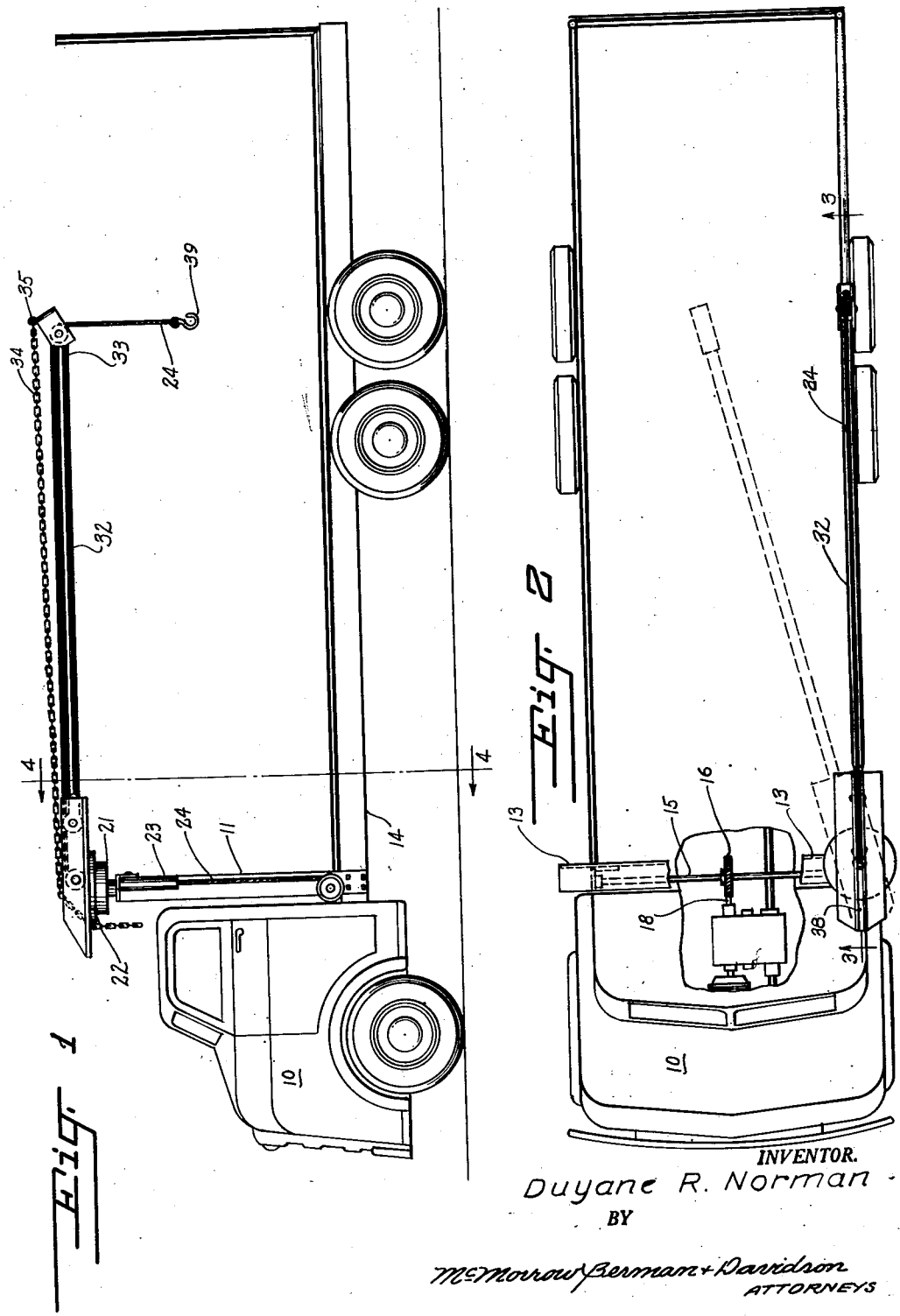

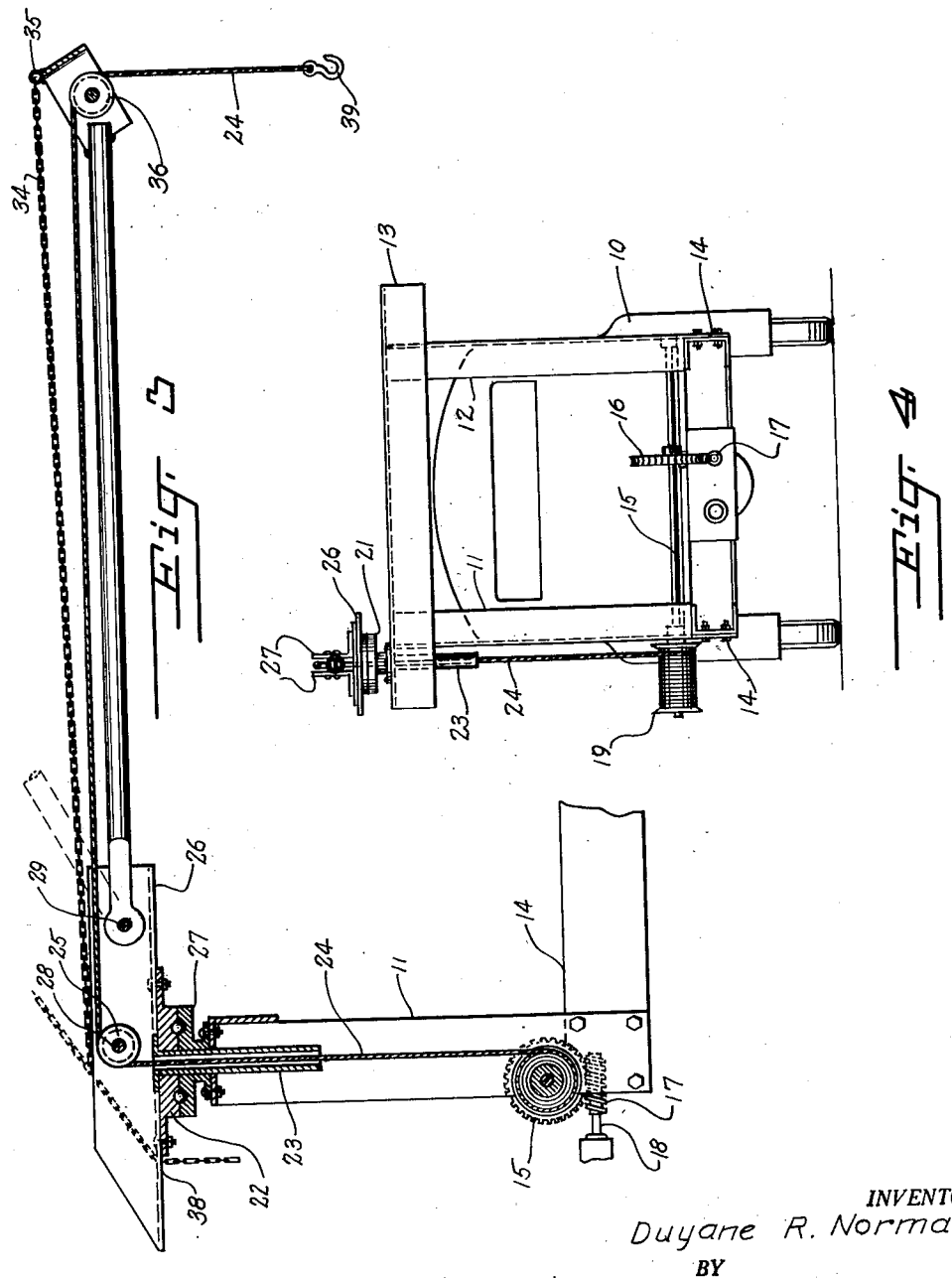

Patented July 16, 1957

2,799,402
POWER DRIVEN LOADING DEVICE

Duyane R. Norman, Ringgold, La.

Application August 13, 1954, Serial No. 449,748

3 Claims. (Cl. 212—65)

The present invention relates generally to material handling and specifically an improved power hoist for mounting on a truck and/or tractor drawn so as to be available for loading and unloading materials on the truck and/or tractor drawn vehicle and whereever truck is used in this application, it is also intended to include tractor or tractor-drawn vehicle.

The principal object of the present invention is to provide a hoisting device having a new and novel power source, and one easy to use with a minimum of effort.

Another object of the present invention is to provide a device which simplifies loading and unloading of a truck, and which may be operated by a single operator without the need for any special skill or training.

A further object of the present invention is to provide a hoist driven by power take-off mechanism of a truck engine without a complicated gear system involving brakes, reversing gears and the like.

A still further object of the present invention is to provide a hoist which occupies little space on the truck body and which swings completely around in a full circle and can be adjusted to various heights.

These and other objects and advantages of the present invention will be fully apparent from the following description when considered in connection with the annexed drawings, in which:

Figure 1 is a plan view in elevation of an embodiment of the present invention mounted on a truck, Figure 2 is a vertical view showing somewhat schematically the power take-off connection, Figure 3 is a side view partially in cross section as seen on line 3—3 of Figure 2, and Figure 4 is an end view looking forwardly as on line 4—4 of Figure 1.

Referring in more detail to the drawing, in which like reference numerals indicate like parts throughout the several views, the illustrated device comprises a truck 10: a pair of vertical side posts 11 and 12 and a horizontally positioned beam 13 secured on the upper ends of the posts, which are bolted or welded at their lower ends to the truck frame 14.

The side posts 11 and 12 support a horizontal shaft 15 having a driven gear 16 in mesh with a worm gear 17 on a truck power take off shaft 18. One one end of the shaft 15 is secured the drum 19, and secured to the beam 13 above the drum is a bearing plate 21 having a rotatable table member 22 supported thereon. A tube 23 extends through the plate 21 and the table member 22 for passage of the rope 24 to the drum and over the sheave 25.

On the table member 22 is secured a boom support 26 made up of two angle iron beams 27 secured with a leg of each in vertically spaced parallel face to face relation and having their other legs secured horizontally on the table member 22. The sheave 25 is rotatable on a short shaft 28 having its ends journaled in the facing legs of the angle iron beams. Another shaft 29 similarly journaled and pivotally supporting one end 31 of the boom 32, the other end 33 of which has a boom chain 34 fixed to it by one end 35. Another sheave 36 is rotatably secured on the free end of the beam. The other end 37 of the chain is adjustably secured in the space between the beams 27, the links of the chain being held in the slot 38 formed by the beams.

Figures 1 and 3 show the boom 32 horizontal in a position for transport, while the dotted lines in Figure 3 indicate the approximate raised position of the boom during use and showing how the chain supports the boom in this position.

The drum 19 rotates as a result of the power takeoff mechanism of the truck engine, and in operation, the rope is given one or two turns around the drum and is pulled into friction drive engagement with the drum, in the manner commonly known as cat head. The rope is fitted with a lifting or hoisting hook 39 at its other end. The rope will not accumulate on the drum, and therefore no reverse gear is necessary, mere slacking off of the pull on the held end of the rope serving to lower the load on the hook, slowly or quickly, depending on the tension and friction of the rope on the rotating drum.

It will be seen therefore that no control of the truck engine is needed, the drum may rotate continuously and the operator can step to the side of the truck and quickly throw two or three turns of rope on the drum, and stepping back, take up the slack as the cargo is raised, then by slacking off on the rope deposit the load where it is wanted. The boom will swivel to all sides and to the front and back of the truck and a light line (not shown) secured to the free end of the boom will enable the same operator to swing it as needed.

The invention thusly described permits safe loading and unloading of logs and other bulky objects by a single operator, there being no gear box to control and no brakes to slip while the operator shifts the boom. The boom of this invention may be shifted on its bearing plate while the rope is held at the degree of tension necessary to maintain the load off the ground.

While a preferred embodiment of the present invention has been here illustrated and described, other embodiments may be made and practised and many changes and alterations in the form and construction may be made within the scope of the appended claims without departing from the spirit of the invention.

What is claimed is:

1. In a loading device, a support, at least one post fixed on and rising from said support, said post having an upper end, a horizontal beam secured to said upper end, a boom support, means pivoting said boom support on a vertical axis on said beam, said boom support having spaced side members, a first shaft extending between and journaled on said side members, a boom having an inward end pivoted on said first shaft and an outer free end, a second shaft extending between and journaled on said side members inwardly of said inward end of the boom, means reaching between and secured to the boom housing and to the free outer end of the boom determining the inclination of the boom to the horizontal, a first sheave on said free end of the boom, a second sheave on said second shaft, a rope trained over said first and second sheaves, said rope having an outer end having a hoisting hook and an inner end portion, a drum mounted rotatably on said post below said beam around which the said inner end portion of the rope is wound, and means for rotating the drum in one direction.

2. In a loading device, a support, at least one post fixed on and rising from said support, said post having an upper end, a horizontal beam secured to said upper end, a boom support, means pivoting said boom support on a vertical axis on said beam, said boom support having spaced side members, a first shaft extending between and journaled on said side members, a boom having an inward end pivoted on said first shaft and an outer free end, a second shaft extending between and journaled on said side members inwardly of said inward end of the boom, means reaching between and secured to the boom housing and to the free outer end of the boom determining the inclination of the boom to the horizontal, a first sheave on said free end of the boom, a second sheave on said second shaft, a rope trained over said first and second sheaves, said rope having an outer end having a hoisting hook and an inner end portion, a drum mounted rotatably on said post below said beam around which the said inner end portion of the rope is wound, and means for rotating the drum in one direction, said pivot means comprising a vertical tube depending through said beam, said other end portion of the rope passing from said second sheave through said tube to said drum.

3. In a loading device, a support, at least one post fixed on and rising from said support, said post having an upper end, a horizontal beam secured to said upper end, a boom support, means pivoting said boom support on a vertical axis on said beam, said boom support having spaced side members, a first shaft extending between and journaled on said side members, a boom having an inward end pivoted on said first shaft and an outer free end, a second shaft extending between and journaled on said side members inwardly of said inward end of the boom, means reaching between and secured to the boom housing and to the free outer end of the boom determining the inclination of the boom to the horizontal, a first sheave on said free end of the boom, a second sheave on said second shaft, a rope trained over said first and second sheaves, said rope having an outer end having a hoisting hook and an inner end portion, a drum mounted rotatably on said post below said beam around which the said inner end portion of the rope is wound, and means for rotating the drum in one direction, said beam having an end portion extending laterally beyond the post, and said boom support being pivoted on and overlying said end portion of the beam.

References Cited in the file of this patent
UNITED STATES PATENTS

| | | |
|---|---|---|
| 1,127,636 | Kindred | Feb. 9, 1915 |
| 1,448,814 | Norris | Mar. 20, 1923 |
| 2,519,119 | Dalbeck | Aug. 15, 1950 |